United States Patent
Mizuo

(10) Patent No.: US 8,284,261 B2
(45) Date of Patent: Oct. 9, 2012

(54) EXTERNAL RANGING IMAGE PICKUP APPARATUS AND RANGING METHOD

(75) Inventor: Yoshihiro Mizuo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 12/876,656

(22) Filed: Sep. 7, 2010

(65) Prior Publication Data

US 2011/0058097 A1    Mar. 10, 2011

(30) Foreign Application Priority Data

Sep. 10, 2009 (JP) ................. 2009-209422

(51) Int. Cl.
*H04N 5/228* (2006.01)
*H04N 3/00* (2006.01)
(52) U.S. Cl. ............... 348/208.12; 348/326; 348/345; 396/104
(58) Field of Classification Search ............ 348/345, 348/326, 208.12
See application file for complete search history.

(56) References Cited

U.S. PATENT DOCUMENTS

| | | | | |
|---|---|---|---|---|
| 2003/0081137 | A1* | 5/2003 | Yamazaki | 348/354 |
| 2007/0229797 | A1 | 10/2007 | Sugimoto | |
| 2007/0230933 | A1* | 10/2007 | Sugimoto et al. | 396/61 |
| 2008/0247741 | A1* | 10/2008 | Yasuda | 396/104 |
| 2009/0115887 | A1* | 5/2009 | Sugimoto | 348/349 |
| 2009/0116830 | A1* | 5/2009 | Kumagai | 396/125 |
| 2009/0135291 | A1* | 5/2009 | Sugimoto | 348/347 |

FOREIGN PATENT DOCUMENTS

| JP | 2007-263926 | 10/2007 |
|---|---|---|
| JP | 2008-026804 | 2/2008 |

* cited by examiner

*Primary Examiner* — Hung Lam
(74) *Attorney, Agent, or Firm* — Cowan, Liebowitz & Latman, P.C.

(57) ABSTRACT

The image pickup apparatus includes a first detection unit detecting information corresponding to an object distance in each of plural areas, without through an image taking optical system, a second detection unit detecting a size and a position of a specific object area in object image data, and a controller performing focus control of the image taking optical system on the basis of the information corresponding to the object distance. The controller acquires specific object distance information on a distance to a specific object, on the basis of the size of the specific object area and information on a focal length of the image taking optical system, and selects, from the plural areas, an area where the information corresponding to the object distance to be used in focus control is detected, on the basis of the specific object distance information and the position of the specific object area.

3 Claims, 15 Drawing Sheets

CLOSE DISTANCE (1m)

MIDDLE DISTANCE (3m)

FAR DISTANCE (100m)

MIDDLE DISTANCE(3m)

CLOSE DISTANCE (1m)

MIDDLE DISTANCE (3m)

CLOSE DISTANCE (1m)

EXTERNAL RANGING IMAGE PICKUP APPARATUS AND RANGING METHOD

BACKGROUND OF THE INVENTION

The present invention relates to an image pickup apparatus provided with a ranging sensor outside an image pickup optical system.

DESCRIPTION OF THE RELATED ART

Some auto-focus functions equipped with image pickup apparatuses such as digital cameras detect a focus state of an image taking optical system by detecting a phase difference of two optical object images formed by the image taking optical system or by detecting high-frequency components of image data generated by photoelectric conversion of an optical object image. Other some auto-focus functions, which are different from the above-described internal focus detection systems, are external ranging systems measuring an object distance by using a ranging sensor provided outside the image taking optical system (hereinafter referred to as an "external ranging sensor"), that is, without through the image taking optical system.

In the external ranging system, a parallax is generated between a view field of the image pickup optical system and a view field of the external ranging sensor. The parallax displaces a ranging area where ranging (object distance measurement) is performed by the external ranging sensor with respect to a ranging area set in the view field of the image pickup optical system, which may cause inaccurate ranging.

Japanese Patent Laid-Open No. 2008-26804 discloses an external ranging image pickup apparatus capable of conforming the ranging area of the external ranging sensor to the ranging area in the view field of the image taking optical system for solving the above-described problem.

Further, Japanese Patent Laid-Open No. 2007-263926 discloses an external ranging image pickup apparatus provided with a face detection function capable of detecting person's faces in image data by image processing. In this external ranging image pickup apparatus, it is also possible to estimate a distance from the image pickup apparatus to the person that is a main object on the basis of a size of the face detected in the image data.

However, the parallax of the view fields of the image taking optical system and the external ranging sensor is changed depending on the object distance and a focal length of the image pickup optical system. Therefore, it is necessary for the external ranging image pickup apparatus provided with the face detection function that changes of the parallax depending on the object distance and the focal length be considered in order to quickly obtain a highly accurate in-focus state for the detected face.

SUMMARY OF THE INVENTION

The present invention provides an external ranging image pickup apparatus capable of quickly obtaining a highly accurate in-focus state for a specific object.

The present invention provides as one aspect thereof an image pickup apparatus configured to electrically convert an optical object image formed by an image taking optical system to generate object image data. The apparatus includes a first detection unit configured to detect information corresponding to an object distance in each of plural areas, without through the image taking optical system, a second detection unit configured to detect a size and a position of a specific object area in the object image data, the specific object area being a part of the object image data corresponding to the specific object, and a controller configured to be perform focus control of the image taking optical system on the basis of the information corresponding to the object distance detected by the first detection unit. The controller is configured to acquire specific object distance information on a distance from the apparatus to the specific object, on the basis of the size of the specific object area detected by the second detection unit and information on a focal length of the image taking optical system, and to select, from the plural areas, an area where the information corresponding to the object distance to be used in the focus control is detected, on the basis of the specific object distance information and the position of the specific object area detected by the second detection unit.

The present invention provides as another aspect thereof a ranging method for an image pickup apparatus configured to electrically convert an optical object image formed by an image taking optical system to generate object image data, configured to detect information corresponding to an object distance in each of plural areas, without through the image taking optical system, and configured to perform focus control of the image taking optical system on the basis of the information corresponding to the detected object distance. The method includes a step of detecting a size and a position of a specific object area in the object image data, the specific object area being a part of the object image data corresponding to the specific object, a step of acquiring specific object distance information on a distance from the apparatus to the specific object, on the basis of the detected size of the specific object area and information on a focal length of the image taking optical system, and a step of selecting, from the plural areas, an area where the information corresponding to the object distance to be used in the focus control is detected, on the basis of the specific object distance information and the detected position of the specific object area.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

First, prior to description of specific embodiments of the present invention, description will be made of matters common to the embodiments.

Figure 1:
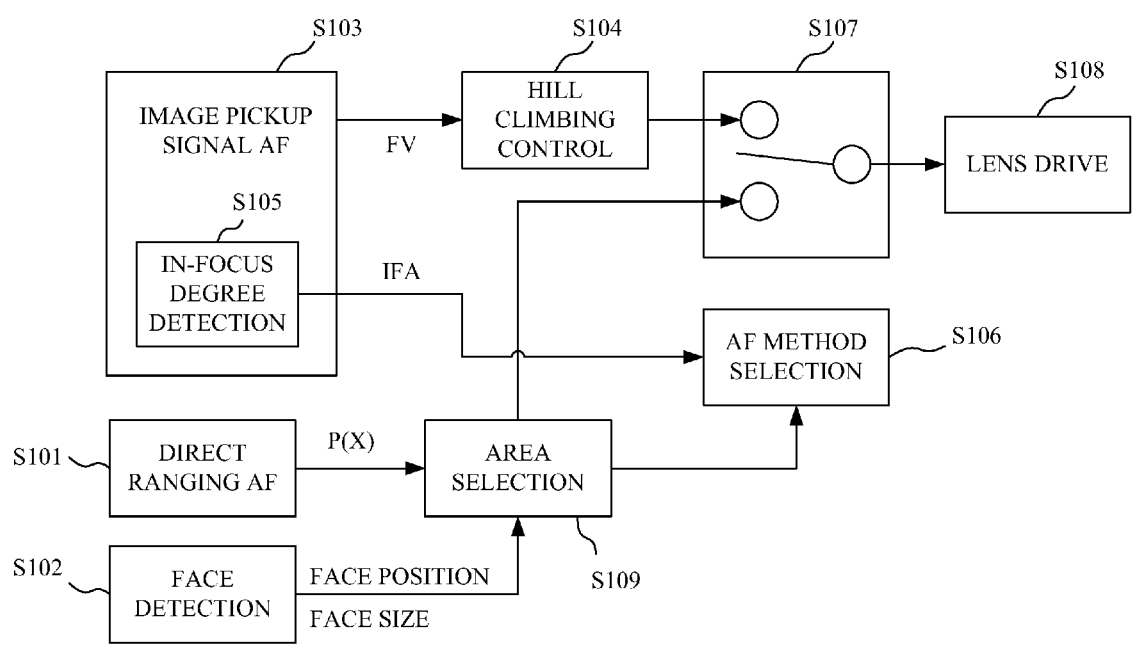
FIG. 1 shows concept of an AF method in an image pickup apparatus that is an embodiment of the present invention.

FIG. 1 schematically shows an AF (auto-focus) method employed in the embodiments. At step S101, the method causes a direct ranging AF unit to perform a ranging operation that is external ranging (hereinafter referred to as "direct ranging"). The direct ranging AF unit uses an external ranging sensor, which will be described later, to perform the direct ranging for acquiring information on an object distance. The external ranging sensor has plural ranging areas, and is capable of performing the ranging operation in each of the plural ranging areas. Further, the external ranging sensor is provided outside an image taking optical system of a camera (image pickup apparatus) of the embodiments, thus performing the ranging operation without through the image taking optical system.

The information on the object distance may be information directly showing the object distance, or may be information showing other values corresponding to the object distance (for example, a phase difference of two images formed on the external ranging sensor). The direct ranging AF unit outputs a signal P(X) (X denotes a number of the ranging area) that shows the information on the object distance. Such AF using the signal P(X) obtained by the direct ranging is referred to as "direct ranging AF. The signal P(X) is hereinafter referred to as the "object distance signal P(X)".

At step S102, the method detects a specific object area that is a part of an image signal (or object image data) generated by using an image pickup element equipped in the camera to output a signal showing detected data. The signal showing the detected data is hereinafter referred to as the "detection data signal". The specific object area is an image part including a face of a person who is a main object. The face is a specific object, and the specific object area is hereinafter referred to as the "face area".

At step S109, the method selects, on the basis of the object distance signal P(X) and information on the face area showing a size and a position thereof, one or more ranging areas among the plural ranging areas provided in the external ranging sensor, and provides the object distance signal P(X) to a switch (S107).

Moreover, at step S109, the method sends information on whether or not a ranging area can be selected effective for the face area to an AF method selecting step (S106).

At step S103, the method generates, in order to perform image pickup signal AF (also referred to as "TV-AF" or "contrast AF"), an AF evaluation value FV from high-frequency components of the image signal. At step S104, the method performs a so-called hill climbing operation to search for an in-focus position (in-focus point) of a focus lens included in the image taking optical system by using the AF evaluation value FV. At step S105 included in step S103, the method detects an in-focus degree IFA that is an index showing how close the position of the focus lens is to the in-focus point, and then sends the in-focus degree IFA to the AF method selecting step (S106).

At step S106, the method switches the switch (S107) so as to select a using AF method from the direct ranging AF and the image pickup signal AF, depending on information on the in-focus degree IFA and information on whether or not it is possible to select the face area. At step S108, the method drives the focus lens according to a result obtained by the selected AF method to achieve an in-focus state for the face that is an in-focus target object.

Embodiment 1

Figure 2:
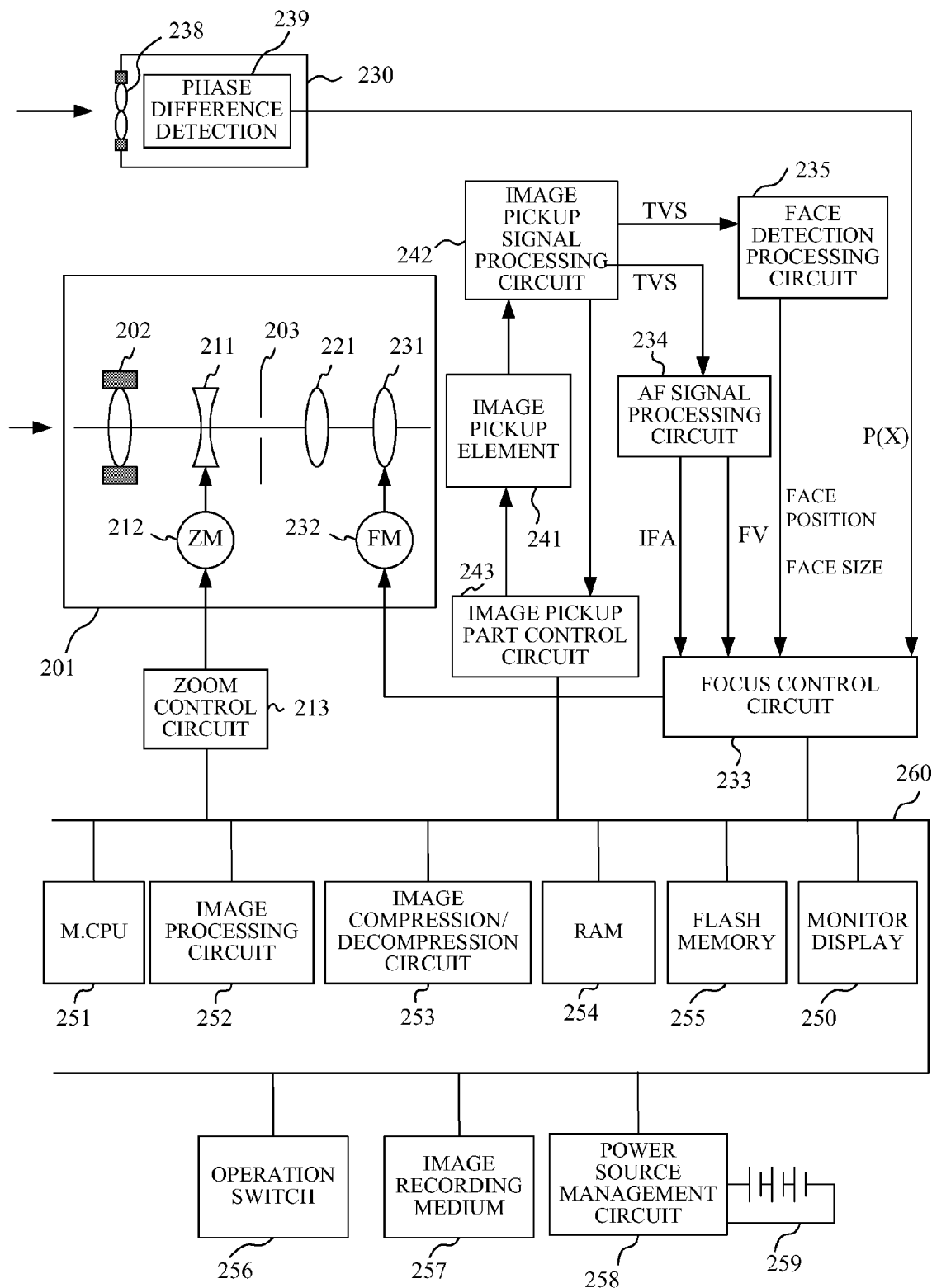
FIG. 2 is a block diagram showing a system configuration of the image pickup apparatus of the embodiment.

FIG. 2 shows a configuration of a camera (image pickup apparatus) that is a first embodiment (Embodiment 1) of the present invention, such as a video camera and a digital camera. The configuration of this camera is common to that of a second embodiment (Embodiment 2) described later.

Respective units in the camera are mutually connected through a bus 260, and controlled by a main CPU 251.

A lens unit 201 that is an image taking optical system includes, in order from an object side to an image plane side in an optical axis direction, a fixed front lens 202, a zoom lens 211, an aperture stop 203 and a fixed third lens 221 and a focus lens 231. Light from an object passes through the lens unit 201 to form an optical object image on an image pickup element 241. The image pickup element 241 photoelectrically converts the optical object image to output an electric signal.

A zoom control circuit 213 drives a zoom motor 212 according to an instruction from the main CPU 251. Thus, the zoom lens 211 is moved in the optical axis direction, thereby changing a focal length (that is, a zoom state) of the lens unit 201.

A charge accumulation operation and a signal output operation of the image pickup element 241 are controlled by an image pickup part control circuit 243. An image pickup signal processing circuit 242 performs various processing on the electric signal output from the image pickup element 241 to generate an image signal TVS. The image signal TVS is input to an AF signal processing circuit 234 and a face detection processing circuit 235 corresponding to a second detection unit. The AF signal processing circuit 234 generates the above-described AF evaluation value FV and in-focus degree IFA to output them to a focus control circuit 233. The face detection processing circuit 235 searches for the above-described face area from the image signal (that is, from image data) and outputs, if detecting the face area, the above-described information showing the size and position of the face area in the image data to the focus control circuit 233.

On the other hand, a direct ranging AF unit 230 which corresponds to a first detection unit and is provided outside the lens unit 201 calculates the above-described object distance signal P(X) that is the information on the object distance, and then outputs it to the focus control circuit 233. The direct ranging AF unit 230 includes a phase difference sensor 239 that detects paired object images (hereinafter referred to as "two images") formed thereon through a pupil division optical system 238 as an AF lens. The direct ranging AF unit 230 calculates the object distance signal P(X) on the basis of a detection result of a phase difference amount of the two images, the phase difference amount being obtained by photoelectric conversion of the two images performed by the phase difference sensor 239.

The focus control circuit 233 performs AF processing on the basis of the object distance signal P(X) when the direct ranging AF is selected as the using AF method or on the basis of the AF evaluation value FV when the image pickup signal AF is selected as the using AF method. Specifically, the focus control circuit 233 controls a focus motor 232 such that the focus lens 231 is moved to a position in the optical axis direction corresponding to the object distance signal P(X) or to a position in the optical axis direction where the AF evaluation value FV becomes a maximum value. Moreover, even when any one of the AF method is used, one or more ranging areas where the object distance signal P(X) or the AF evaluation value FV is obtained are selectable on the basis of the information showing the size and position of the face area. The focus control circuit 233 and the main CPU 251 constitute a controller.

The image signal generated by the image pickup signal processing circuit 242 and output to the bus 260 through the image pickup part control circuit 243 is temporarily accumulated in a RAM 254. The image signal read out from the RAM 254 is subjected to compression processing at an image compression/decompression circuit 253, and then is recorded in an image recording medium 257. Moreover, the image signal read out from the RAM 254 is reduced or expanded to an appropriate size at an image processing circuit 252. The appropriately reduced or expanded image signal is displayed on a monitor display 250. The display of the image signal makes it possible for a user to observe the object before image capturing and a captured image.

An operation switch 256 is operated by the user to input various instructions. A battery 259 that is a power supply is managed by a power supply management circuit 258, thereby enabling stable power supply to the entire camera.

When the camera is activated, computer programs stored in a flash memory 255 are loaded into part of the RAM 254. The main CPU 251 performs various operations including the AF processing according to the computer programs loaded into the RAM 254.

Figure 3:
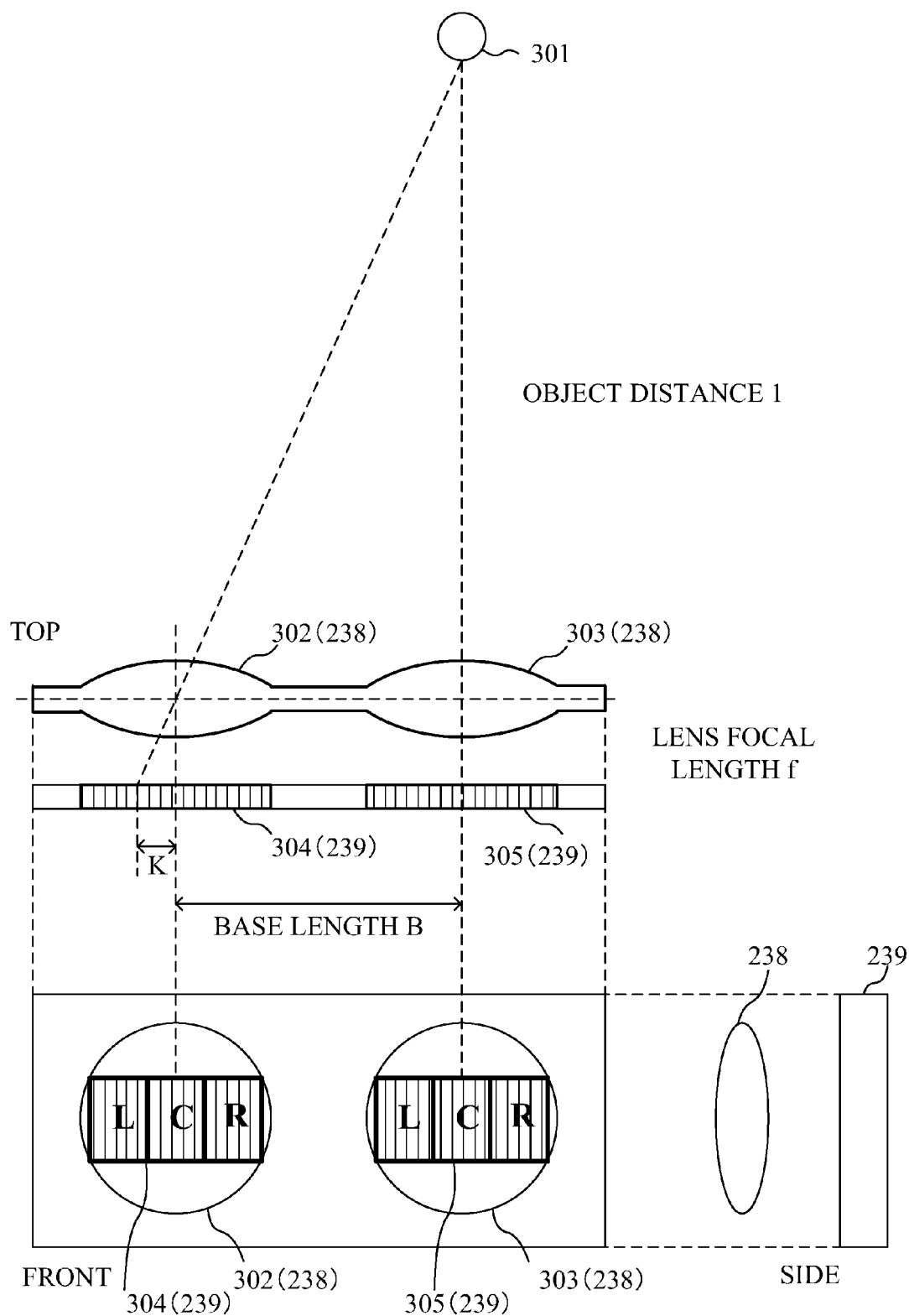
FIG. 3 shows a configuration of an external ranging sensor equipped in the image pickup apparatus of the embodiment.

Description will be made of a configuration and a ranging principle of the direct ranging AF unit 230 provided outside the lens unit 201 with reference to FIG. 3. FIG. 3 shows an upper view, a front view and a side view of the direct ranging AF unit 230.

Reference numeral 301 denotes an object such as a person. Reference numerals 304 and 305 respectively denote a left sensor portion and a right sensor portion of the phase difference sensor 239, each sensor portion being constituted by photoelectric conversion elements arranged in line. In the following description, the left sensor portion 304 and the right sensor portion 305 are respectively referred to as the "left line sensor 304" and the "right line sensor 305".

Light from the object 301 passes through a left lens portion 302 and a right lens portion 303 which are formed in the AF lens 238 to form optical object images (two images) on the left line sensor 304 and the right line sensor 305. A distance (object distance) l from the camera to the object 301, more strictly a distance from the direct ranging AF unit 230 constituted by the AF lens 238, the left line sensor 304 and the right line sensor 305 to the object 301 is expressed as follows:

$$l = B \times f / n$$

where B represents a base length between the left lens portion 302 and the right lens portion 303, f represents a focal length of the AF lens 238, and n represents a phase difference of the optical object images detected by the left line sensor 304 with reference to the object image detected by the right line sensor 305.

Then, an in-focus point of the focus lens 231 is calculated on the basis of the object distance signal P(X) expressed as a function of the object distance l or the phase difference n.

In this embodiment, the right and left line sensors 304 and 305 are respectively divided into plural (three in this embodiment) ranging areas shown in FIG. 3 by reference characters L, C and R from the left. The object distance signal P(X) for each ranging area (X is any one of L, C and R) is output to be input to the focus control circuit 233.

Figure 4:
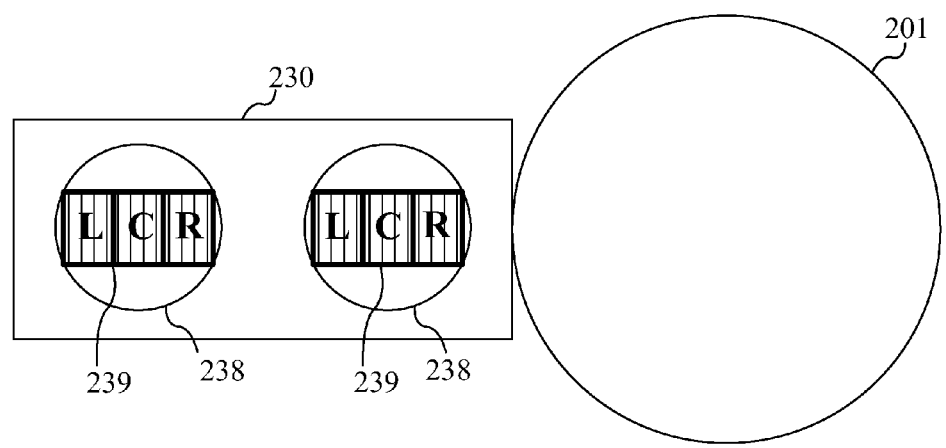
FIG. 4 shows arrangement of the external ranging sensor equipped in the image pickup apparatus of the embodiment.

FIG. 4 shows arrangement of the direct ranging AF unit 230 and the lens unit 201 when viewed from a front of the camera. When viewed from the front, the direct ranging AF unit 230 is disposed on a left side outside the lens unit 201. This arrangement is merely an example, and the direct ranging AF unit 230 may be disposed on a right side, an obliquely upper side and an obliquely lower side outside the lens unit 201.

Figure 5:
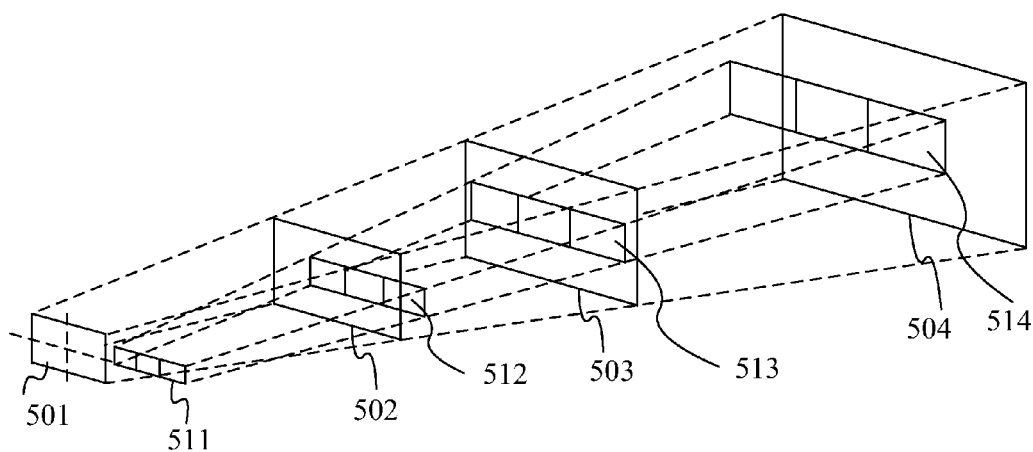
FIG. 5 shows a parallax between a view field of an image taking optical system equipped in the image pickup apparatus of the embodiment and a view field of the external ranging sensor.
Figure 6:
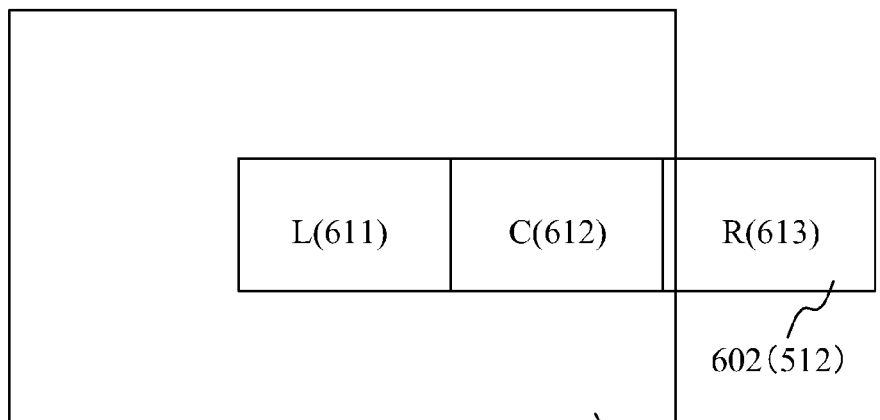
FIG. 6 shows the parallax at each of object distances in the image pickup apparatus of the embodiment.
Figure 6:
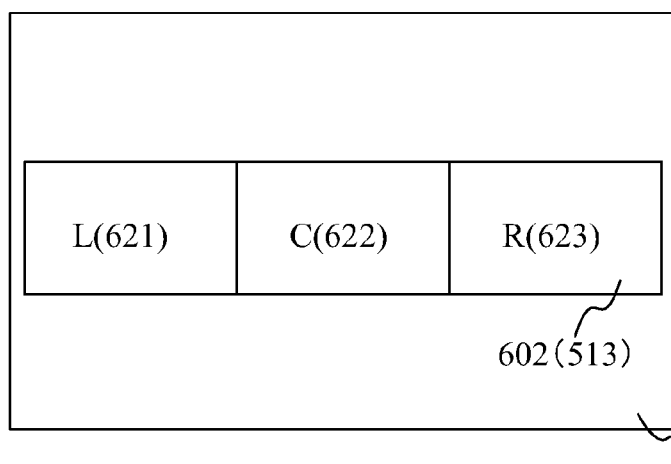
Figure 6:
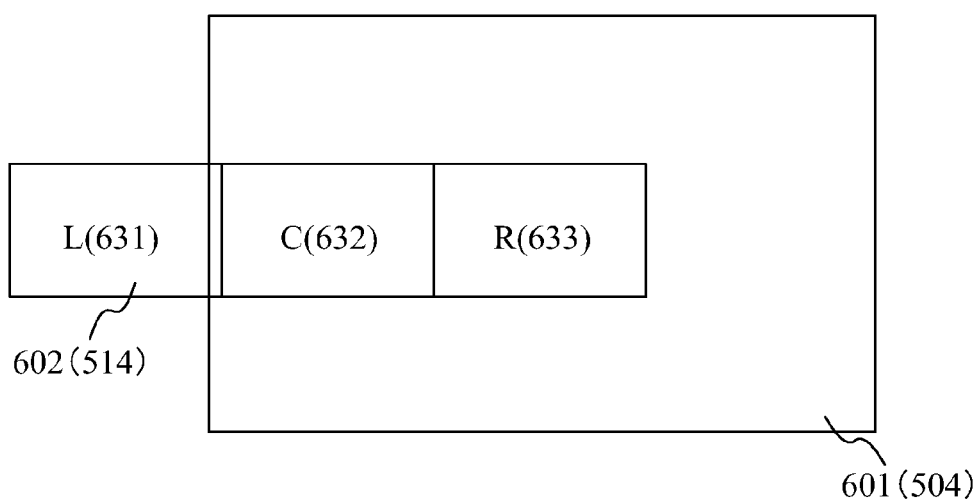

The arrangement of the direct ranging AF unit 230 and the lens unit 201 generates a parallax between a view field of the direct ranging AF unit 230 and a view field of the lens unit 201. The parallax is changed depending on the object distance. FIG. 5 shows the view field of the direct ranging AF unit 230 and the view field of the lens unit 201 which are changed depending on the object distance. FIG. 6 shows a relationship between the object distance and the parallax.

In FIG. 5, reference numeral 501 denotes a physical position of the image pickup element 241, and reference numeral 511 denotes a physical position of the phase difference sensor 239 of the direct ranging AF unit 230. Reference numerals 502, 503 and 504 denote view fields of the lens unit 201 when a distance to the object whose optical images are formed on the image pickup element 241 and the phase difference sensor 239 is a close distance, a middle distance and a far distance, respectively. The view field of the lens unit 201 is hereinafter referred to as the "image capturing field". In other words, optical object images in the image capturing fields 502, 503 and 504 are formed on the image pickup element 241.

Reference numerals 512, 513 and 514 denote view fields of the direct ranging AF unit 230 when the distance to the object is the close distance, the middle distance and the far distance, respectively. The view field of the direct ranging AF unit 230 is hereinafter referred to as the "ranging field". Two images of the object in each of the ranging fields 512, 513 and 514 are formed on the phase difference sensor 239. The close, middle and far distances are, for example, 1 m, 3 m and 100 m.

In FIG. 6, reference numeral 601 denotes the image capturing fields 502, 503 and 504 shown in FIG. 5, and reference numeral 602 denotes the ranging fields 512, 513 and 514 shown in FIG. 5. Reference numerals (611, 612 and 613), (621, 622 and 623) and (631, 632 and 633) denote view fields corresponding to the three ranging areas L, C and R of the direct ranging AF unit 230 in the ranging field 602, respectively. The view fields corresponding to the three ranging areas L, C and R in the ranging field 602 are hereinafter also referred to as the "ranging areas L, C, and R".

In the case where the object distance is the close distance, the ranging field 602(512) is displaced to the right with respect to the image capturing field 601(502) due to the parallax. In this case, the ranging areas L(611) and C(612) overlap the image capturing field 601, but the ranging area R(613) little overlaps the image capturing field 601.

In the case where the object distance is the middle distance, the parallax is not generated, and thereby the ranging field 602(513) is located at an unbiased position with respect to the image capturing field 601(503), that is, such that a center of the ranging field 602(513) coincides with that of the image capturing field 601(503). In this case, all of the ranging areas L(621), C(622) and R(623) overlap the image capturing field 601.

In the case where the object distance is the far distance, the ranging field 602(514) is displaced to the left with respect to the image capturing field 601 (504) due to the parallax. In this case, the ranging areas R(633) and C(632) overlap the image capturing field 601, but the ranging area L(631) little overlaps the image capturing field 601.

In the description of the parallax with reference to FIGS. 5 and 6, the zoom lens 211 is fixed to a certain position to fix the focal length of the lens unit 201, that is, a view angle. Movement of the zoom lens 211 for changing the focal length (view angle) changes the overlapping state of the image capturing field and the ranging area from those of the examples shown in FIGS. 5 and 6. Therefore, the camera of this embodiment stores in a flash memory 255 information showing the overlapping state of the capturing field and the ranging area at each position (that is, at each focal length) of the zoom lens 211.

Figure 7:
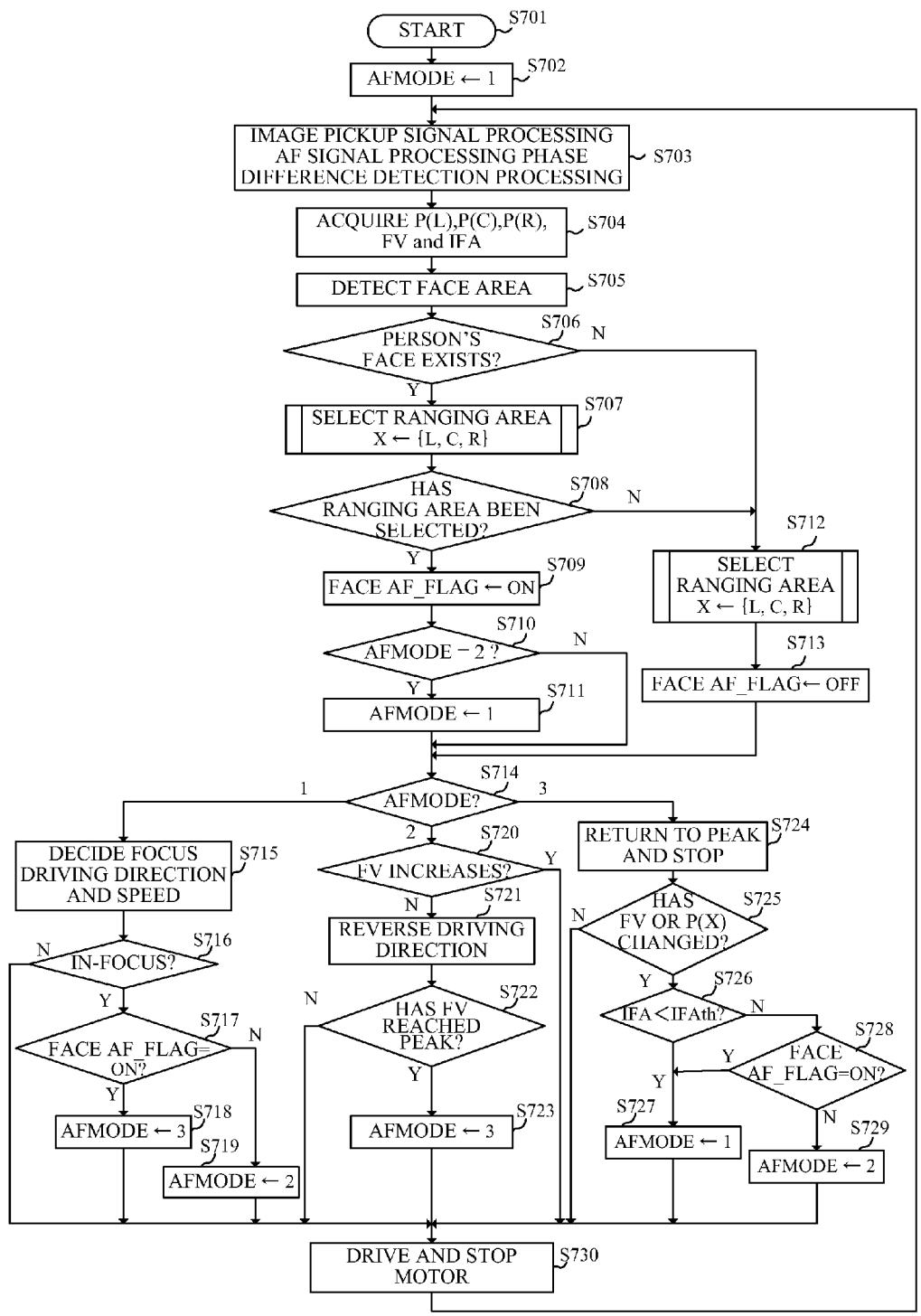
FIG. 7 is a flowchart showing AF processing performed in the image pickup apparatus of the embodiment.

A flowchart of FIG. 7 shows the AF processing in this embodiment (and in Embodiment 2 described later). The main CPU 251 and the focus control circuit 233 chiefly perform the AF processing according to a computer program for the AF processing. In the following description, the main CPU 251 and the focus control circuit 233 are collectively referred to as the "controller".

After stating the AF processing at step S701, the controller at step S702 sets "1" to AFMODE that shows an AF state.

Next, at step S703, the controller causes the image pickup signal processing circuit 242 and the AF signal processing circuit 234 to perform generation processing of the image signal and generation processing of the AF evaluation value FV and the in-focus degree IFA, respectively, and performs processing for calculating the phase difference from the output of the phase difference sensor 239, such that these processing are performed in synchronization with each other.

Next, at step S704, the controller acquires the AF evaluation value FV and the in-focus degree IFA from the AF signal processing circuit 234, and further acquires the object distance signals P(L), P(C) and P(R) of the respective ranging areas L, C and R from the phase difference sensor 239.

Next, at step S705, the controller causes the face detection processing circuit 235 to perform detection processing of the face area in the image signal received from the image pickup signal processing circuit 242. In this processing, the face detection processing circuit 235 determines whether or not a person's face exists in the image signal, and calculates the size and position of the face area including the person's face in the image signal (image data) when the determination is made that the person's face exists.

Then, at step S706, the controller determines whether or not the face area has been detected at step S705. The controller proceeds to step S707 if the face area has been detected, and proceeds to step S712 if the face area has not been detected.

At step S707, the controller determines whether or not, among the ranging areas L, C and R, an appropriate ranging area exists where the ranging operation (direct ranging) is performed for the detected face area whose size and position have been calculated. If such an appropriate ranging area exists, the controller sets L, C or R corresponding to the appropriate ranging area to X of the object distance signal P(X). Specific processing performed at this step will be described later with reference to FIG. 11.

Next, at step S708, the controller determines whether or not the appropriate ranging area for the face area has been selected at step S707. The controller proceeds to step S709 if the selection has been made, and proceeds to step S712 if the selection has not been made.

At step S709, the controller sets a face AF_FLAG to "ON". The face AF_FLAG shows whether "face high-speed AF" that is the direct ranging AF using the ranging area selected for the face area is performed (ON) or not performed (OFF).

Next, at step S710, the controller determines whether or not a current AF mode is set to "AFMODE=2" in which the "face high-speed AF" is not used. If the current AF mode is set to "AFMODE=2", the controller changes the AF mode to "AFMODE=1" at step S711. If the current AF mode is not set to "AFMODE=2", the current AF mode is "AFMODE=1" in which focus control is being performed by the "face high-speed AF" or "AFMODE=3" in which an in-focus state has already been obtained by the "face high-speed AF". In this case, the controller proceeds to step S714 without changing the AF mode. The above-described processing is performed in the case where the face area exists in the image signal and the "face high-speed AF" is performed.

The controller proceeds to step S712 as described above when determining that the face area does not exist at step S706 and when selecting no appropriate ranging area for the face area at step S708. At step S712, the controller performs the following processing so as to select, as the using ranging area where the direct ranging is performed, a ranging area located as close to the center of the image capturing field as possible.

Figure 8:
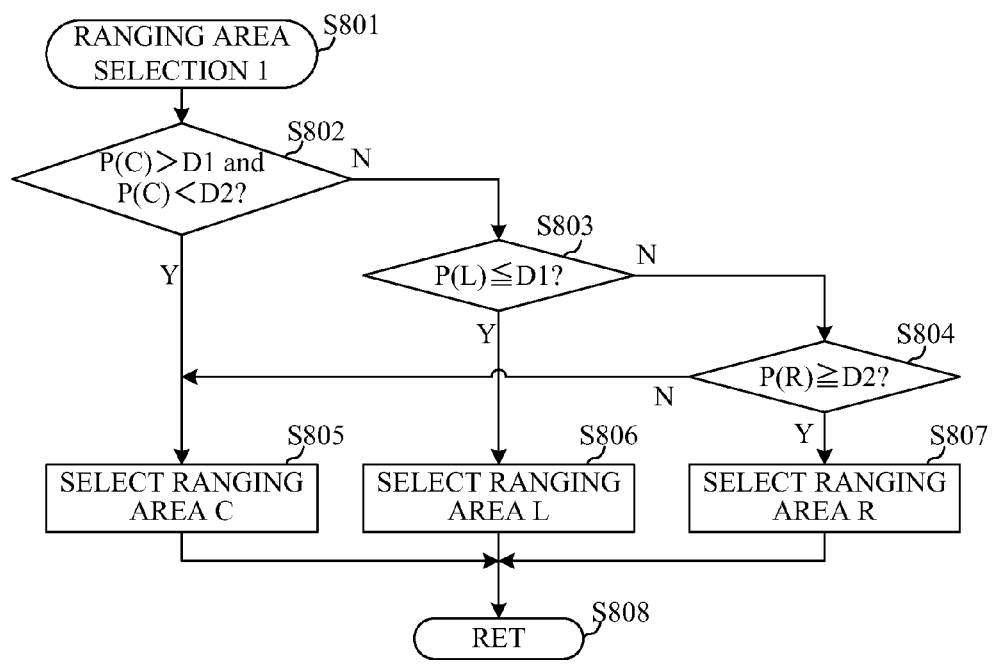
FIG. 8 is a flowchart showing a ranging method performed in the image pickup apparatus of the embodiment when a face is not detected.
Figure 9:
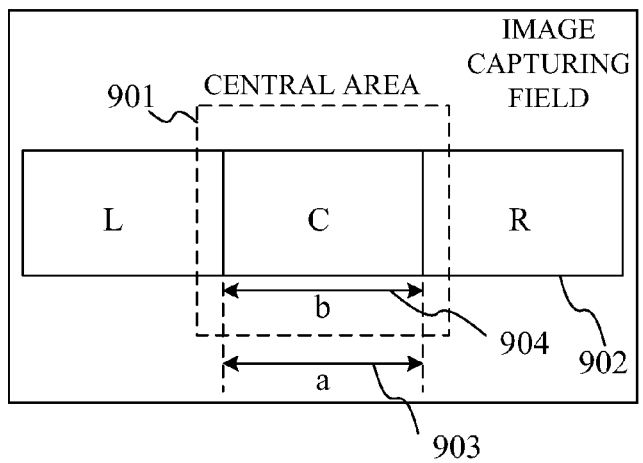
FIG. 9 shows overlap between an external ranging area and a central area of an image capturing field in the image pickup apparatus of the embodiment.
Figure 9:
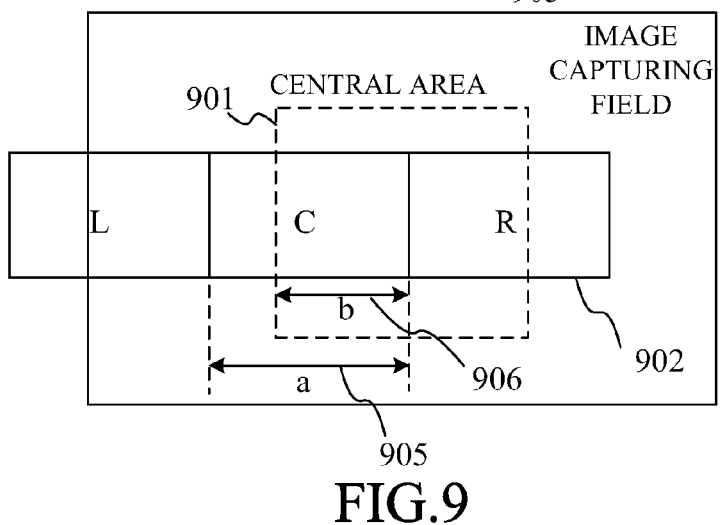

A flowchart of FIG. 8 shows specific processing performed at step S712. FIG. 9 shows a calculation method of a cross ratio showing an overlapping degree of a central area 901 set in the image capturing field and a ranging area 902. A length a(903) denotes a width of the ranging area C, and a length b(904) denotes a width of an overlapping portion where the central area 901 overlaps the ranging area C. A cross ratio CC(object distance) of the ranging area C is expressed as follows:

$$CC(\text{object distance}) = b/a.$$

Cross ratios LC(object distance) and RC(object distance) of the ranging areas L and R can be expressed in the same way as that of the cross ratio CC(object distance).

Figure 10:
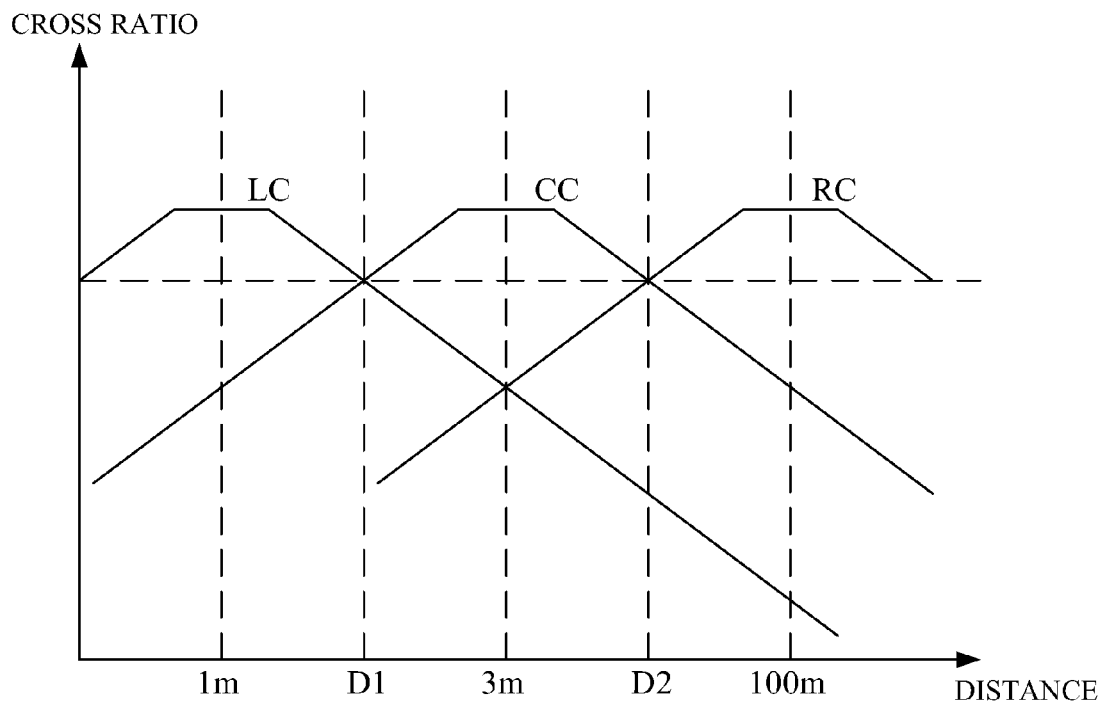
FIG. 10 is a graph showing changes of a cross ratio according to the object distance in the image pickup apparatus of the embodiment.

FIG. 10 provides a graph showing changes of the cross ratio according to the object distance. The camera in this embodiment beforehand stores parameters corresponding to this graph. A horizontal axis of the graph denotes the object distance, and a vertical axis thereof denotes the cross ratio. The cross ratio LC of the ranging area L becomes a maximum at an object distance of about 1 m, the cross ratio CC of the ranging area C becomes a maximum at an object distance of about 3 m, and the cross ratio RC of the ranging area R becomes a maximum at a distance of about 100 m. The cross ratio CC of the ranging area C is higher than the cross ratio LC of the ranging area L at object distances farther than D1 between 1 m and 3 m, and the cross ratio RC of the ranging area R is higher than the cross ratio CC of the ranging area C at object distances farther than D2 between 3 m and 100 m.

In FIG. 8, after starting the processing at step S801, the controller determines at step S802 whether or not the object distance corresponding to the object distance signal P(C) of the ranging area C is longer than D1 and shorter than D2. The controller proceeds to step S805 if the object distance is longer than D1 and shorter than D2, and proceeds to step S803 if the object distance is not longer than D1 or not shorter than D2. At step S805, the controller selects the ranging area C as the using ranging area. Such first confirmation of the object distance corresponding to the object distance signal P(C) of the ranging area C is equivalent to giving higher priority to the ranging area C than the other ranging areas. This is because a main object that is a user's image capturing target is generally located at a center of the image capturing field (image frame) when moving image capturing is performed.

At step S803, the controller determines whether or not the object distance corresponding to the object distance signal P(L) of the ranging area L is D1 or shorter. The controller proceeds to step S806 if the object distance is D1 or shorter, and proceeds to step S804 if the object distance is longer than D1. At step S806, the controller selects the ranging area L as the using ranging area.

At step S804, the controller determines whether or not the object distance corresponding to signal P(R) of the ranging area R is D2 or longer. The controller proceeds to step S807 if the object distance is D2 or longer, and proceeds to step S805 if the object distance is shorter than D2. At step S807, the controller selects the ranging R as the using ranging area. At step S805, the controller selects the ranging area C as described above. The selection of the ranging area C is equivalent to giving higher priority to the ranging area C than the other ranging areas. This embodiment gives priority to image capturing for an object distance about 3 m.

Although the description has been made of the case where the determination relating to the selection of the ranging area R is made at step S804 after the determination relating to the selection of the ranging area L has been made at step S803, the order of these determinations may be reversed. That is, the determination relating to the selection of the ranging area L may be made at step S804 after the determination relating to the selection of the ranging area R has been made at step S803.

Returning to the flowchart of FIG. 7, the controller sets at step S713 the face AF_FLAG to "OFF" after selecting the ranging area at step S712. Then, the controller proceeds to step S714.

At step S714, the controller determines the value of AFMODE. The controller proceeds to step S715 to perform the direct ranging AF if the value of AFMODE is 1 (AFMODE=1), proceeds to step S720 to perform the image pickup signal AF if the value of AFMODE is 2 (AFMODE=2), and proceeds to step S724 if the value of AFMODE is 3 (AFMODE=3). The state of AFMODE=3 shows that an in-focus state is obtained. At step S724, the controller monitors whether or not the AF evaluation value FV is changed. The controller sets, if the AF evaluation value FV is changed, AFMODE=1 or AFMODE=2 to perform the direct ranging AF or the image pickup signal AF again.

Since the value of AFMODE is 1 (AFMODE=1) immediately after the activation of the camera, the controller proceeds from step S714 to step S715. At step S715, the controller decides a driving direction and a driving speed of the focus lens 231 on the basis of the object distance signal P(X) from the ranging area selected at step S707 or step S712 and a current position of the focus lens 231. Specifically, the controller decides the driving direction such that the position of the focus lens 231 approaches an in-focus point corresponding to the object distance signal P(X), and decides the driving speed such that it becomes faster as a distance between the current position of the focus lens 231 and the in-focus point increases.

At step S716, the controller determines whether or not the position of the focus lens 231 coincides with the in-focus point, that is, whether or not the in-focus state is obtained. If the in-focus state is obtained, the controller proceeds to step S717 to determine whether or not the face AF_FLAG is "ON". If the face AF_FLAG is "ON", the controller proceeds to step S718 to set AFMODE=3. On the other hand, if the face AF_FLAG is "OFF", the controller proceeds to step S719 to set AFMODE=2. This is because, though the controller performs the image pickup signal AF after the in-focus state is obtained by the direct ranging AF when a normal AF mode in which the face high-speed AF is not performed is set, the controller always performs the direct ranging AF for the face area when performing the face high-speed AF.

If determining that the in-focus state is not obtained at step S716, the controller proceeds to step S730 to drive the focus motor 232 according to the driving direction and the driving speed decided at step S715.

When proceeding to step S730 after the processing at step S718 or step S719, the controller stops the drive of the focus motor 232.

The controller returns to step S703 from step S730, and then repeats the processing from step S703 in synchronization with a reading cycle of the image pickup element 241.

At step S720, the controller determines whether or not the AF evaluation value FV acquired at step S704 is increased or decreased with respect to the AF evaluation value FV acquired and stored in the previous routine. If the AF evaluation value FV is increased, the controller proceeds to step S730 to drive the focus motor 232 at a predetermined speed. If the AF evaluation value FV is decreased, the controller proceeds to step S721.

At step S721, the controller reverses the driving direction of the focus lens 231. Then, the controller determines at step S722 whether or not the AF evaluation value FV is decreased after reaching a peak (maximum value). If the AF evaluation value FV has not yet reached the peak, the controller proceeds to step S730 to drive the focus motor 232 at the predetermined speed. If the AF evaluation value FV is decreased after reaching the peak, the controller proceeds to step S723 to set AFMODE=3. Thereafter, the controller proceeds to step S730 to stop the drive of the focus motor 232, and then returns to step S703.

At step S724, the controller drives the focus motor 232 such that the focus lens 231 is returned to the in-focus point where the AF evaluation value FV is increased to the peak, and thereafter stops the drive of the focus motor 232.

Next, at step S725, the controller determines whether or not a latest AF evaluation value FV is changed from the AF evaluation value (peak) FV at the in-focus point. At the same time, the controller also determines whether or not a latest object distance signal P(X) is changed from a previous object distance signal P(X). If they are not changed, the controller proceeds to step S730 to maintain a stop state of the focus motor 232, and then returns to step S703.

On the other hand, if at least one of them is changed, the controller proceeds to step S726 to determine whether or not the in-focus degree IFA is lower than a threshold value IFAth, that is, whether the focus state is in an extremely out-of-focus state or a slightly out-of-focus state. If the in-focus degree IFA is lower than the threshold value IFAth, which shows that the focus state is in the extremely out-of-focus state, the controller proceeds to step S727 to set AFMODE=1, and then proceeds to step S730. This restarts the direct ranging AF.

If the in-focus degree IFA is equal to or higher than the threshold value IFAth, which shows that the focus state is in the slightly out-of-focus state, the controller proceeds to step S728 to determine whether or not the face AF_FLAG is "ON". The controller proceeds to step S727 if the face AF_FLAG is "ON", and proceeds to step S729 if the face AF_FLAG is "OFF".

At step S729, the controller sets AFMODE=2 and then proceeds to step S730. This restarts the image pickup signal AF. The controller proceeds from step S730 to step S703.

Figure 11:
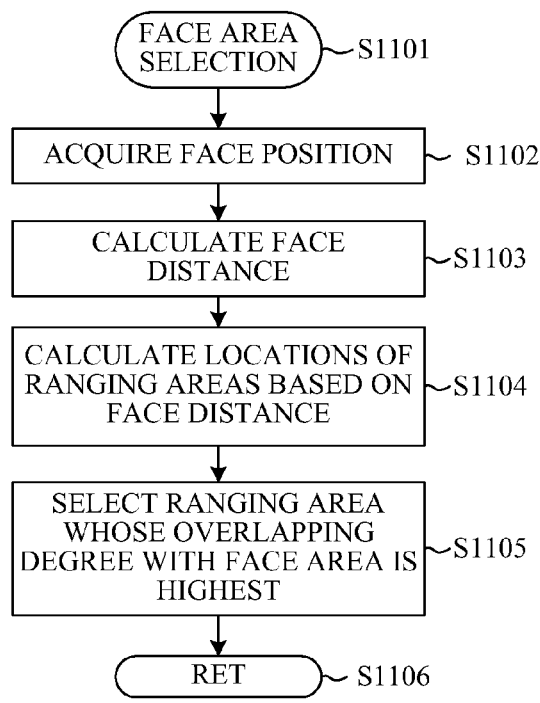
FIG. 11 shows a flowchart showing the ranging method performed in Embodiment 1 of the present invention.

Next, description will be made of the ranging area selection processing performed at step S707 with reference to a flowchart of FIG. 11.

After starting the ranging area selection processing at step S1101, the controller first acquires at step S1102 the position of the face area (hereinafter referred to as the "face position") detected by the face detection processing circuit 235.

Next, at step S1103, the controller acquires the size of the face area detected by the face detection processing circuit 235. Then, the controller produces information on a distance to a face (that is, to a person who has the face) included in the face area from the camera on the basis of the acquired size of the face area and information on a current focal length of the lens unit 201. The information on the distance from the camera to the face is hereinafter referred to as the "face distance". The information on the focal length may be information directly showing the focal length, or may be information showing a position of the zoom lens 211.

Profile data showing a relationship between the size of the face area and the face distance with respect to the image capturing field (view angle) decided depending on the focal length of the lens unit 201 is beforehand stored in a memory such as an internal memory of the main CPU 251. Reading data corresponding to the size of the face area with respect to the image capturing field from the profile data enables production of the face distance. The face distance may be calculated by using a calculation expression such as a function expression whose variables are the information on the focal length and the size of the face area.

Figure 12:
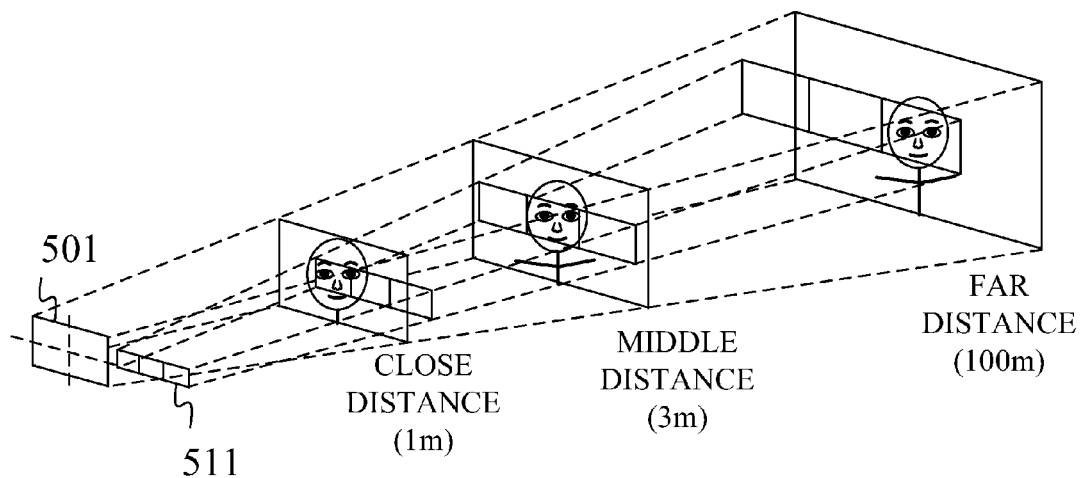
FIG. 12 showing overlap between the external ranging area and a face at each of the object distances in the image pickup apparatus of Embodiment 1.

Next, at step S1104, the controller calculates locations of the ranging areas of the direct ranging AF unit 230 with respect to the face existing at a position corresponding to the face distance calculated at step S1103. This is because, even when a face exists at a same position in the image capturing field, the ranging area whose ranging field overlaps the face is changed depending on whether the object distance is the close distance (1 m), the middle distance (3 m) or the far distance (100 m), as shown in FIG. 12.

Figure 13:
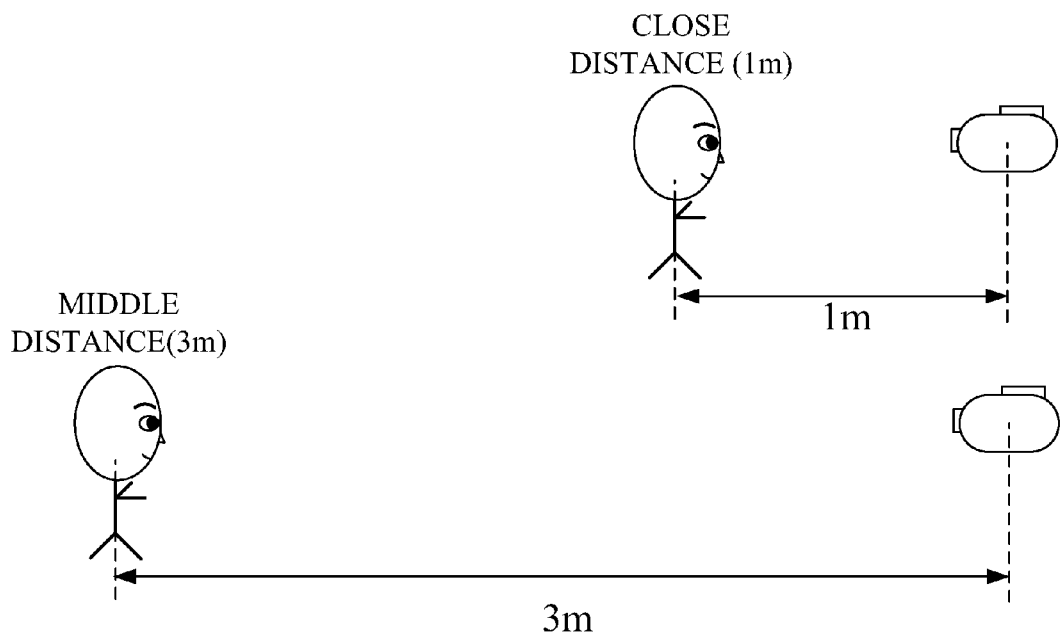
FIG. 13 shows a distance between a person and a camera.
Figure 14:
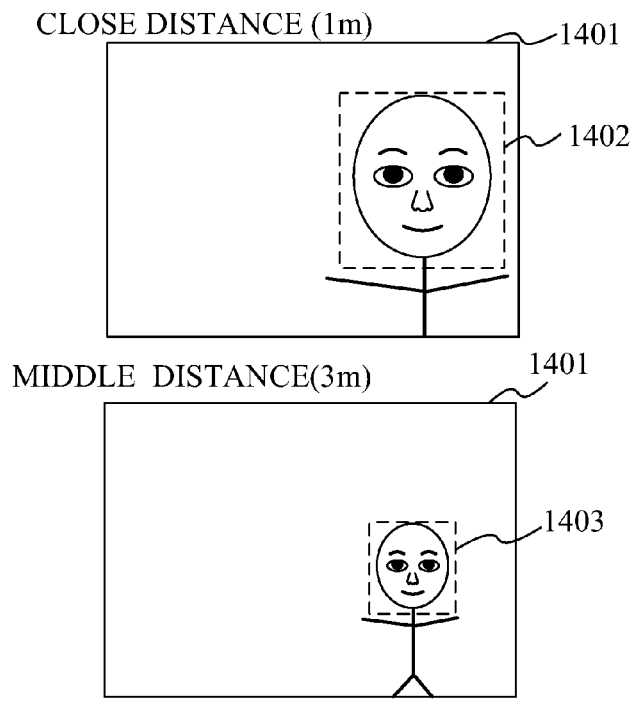
FIG. 14 shows how the face is captured at each of the object distances.

FIG. 13 shows states of image capturing when the object distances are the close distance (1 m) and the middle distance (3 m). FIG. 14 shows the image capturing fields when the object distances are the close distance (1 m) and the middle distance (3 m). In FIG. 14, reference numeral 1402 and 1403 denote frames showing the face area, a size of the frame corresponding to the size of the face area.

In a case where the size of the face area 1402 is obtained with respect to the image capturing field 1401, the face distance is defined as 1 m. Similarly, in a case where the size of the face area 1403 is obtained with respect to the image capturing field 1401, the face distance is defined as 3 m.

Figure 15:
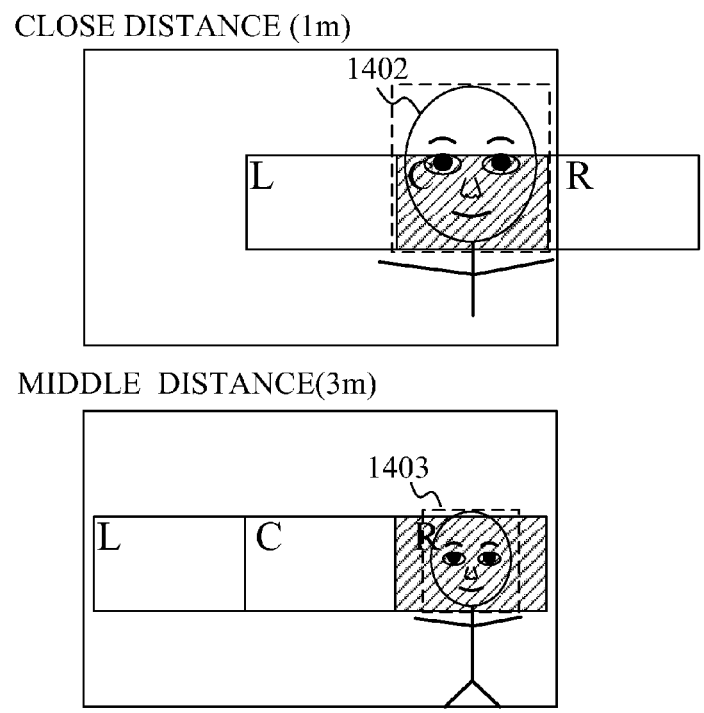
FIG. 15 shows overlap between a face area and the external ranging area at each of the object distances in the image pickup apparatus of Embodiment 1.

Then, at step S1105, the controller selects one ranging area whose overlapping degree with the face area is highest among the three ranging areas L, C and R, on the basis of the face distance and the face position. For example, as shown in FIG. 15, the controller selects the ranging area C for the position of the face area 1402 when the face distance is 1 m. The controller selects the ranging area R for the position of the face area 1403 when the face distance is 3 m. Data showing the ranging area that should be selected for the face distance and the face position is beforehand stored in the memory such as the internal memory of the main CPU 251.

Thus, when finishing the selection of the ranging area, the controller sets L, C or R of the selected ranging area to X at step S1106.

In a case where the overlapping degree with the face area, which is required for the selection of the ranging area at step S1105, is lower than a predetermined threshold value, the controller proceeds to step S712 in FIG. 7 via step S708 without selecting the ranging area by this processing (step S707).

This embodiment can select, when the face area exists in the generated (captured) image, an appropriate ranging area in the direct ranging AF for the face area, thereby enabling high-speed and highly accurate focusing on the face included in the face area.

Embodiment 2

Figure 16:
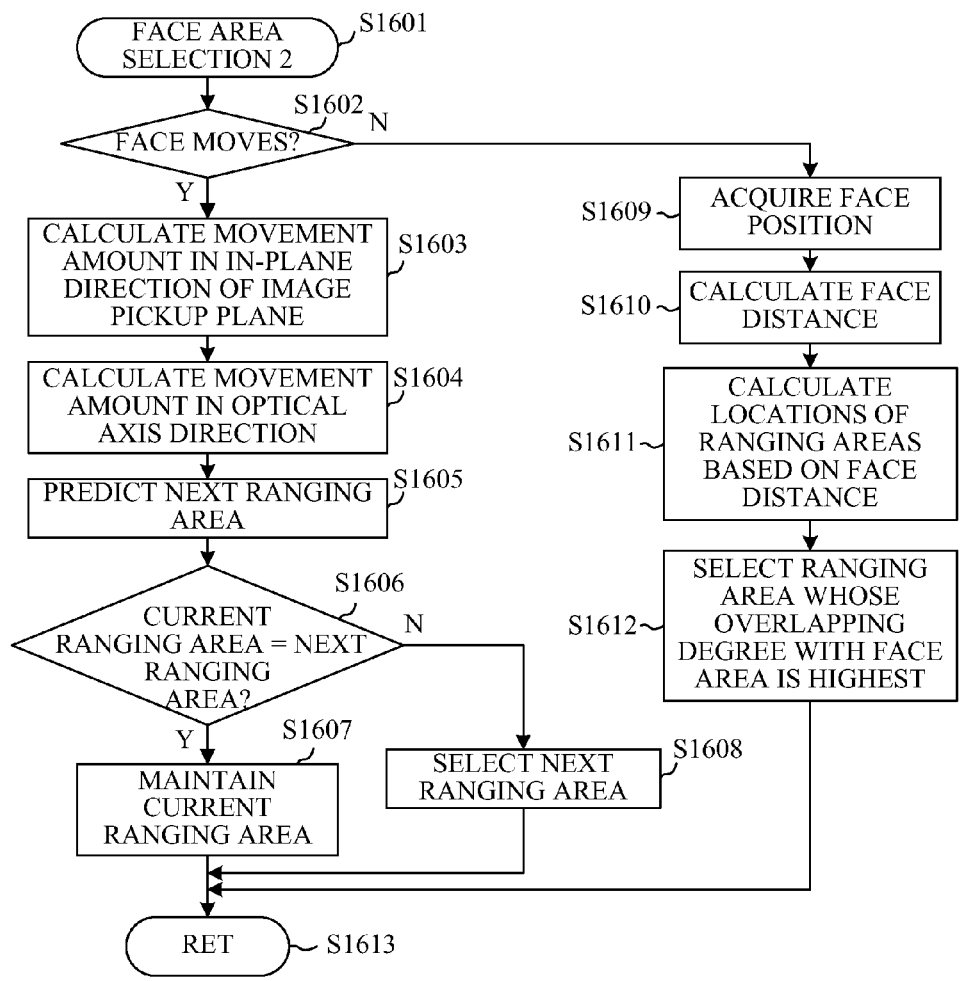
FIG. 16 is a flowchart describing Embodiment 2 of the present invention.

A flowchart of FIG. 16 shows ranging area selection processing in the second embodiment (Embodiment 2) of the present invention. This ranging area selection processing is performed at step S707 in FIG. 7 in place of the ranging area selection processing shown in FIG. 11. Constituent elements of a camera of this embodiment are common to those of the camera of Embodiment 1, and therefore these constituent elements are denoted by the same reference numerals as those in Embodiment 1.

After starting the processing at step S1601, the controller determines at step S1602 whether or not a face included in image data has moved in an in-plane direction of an image pickup plane (that is, in a direction parallel to a light-receiving surface of an image pickup element 241) or in an optical axis direction (that is, a direction orthogonal to the light-receiving surface of the image pickup element 241). This determination can be made by comparing a position and a size of a face area previously detected and those currently detected.

Figure 17:
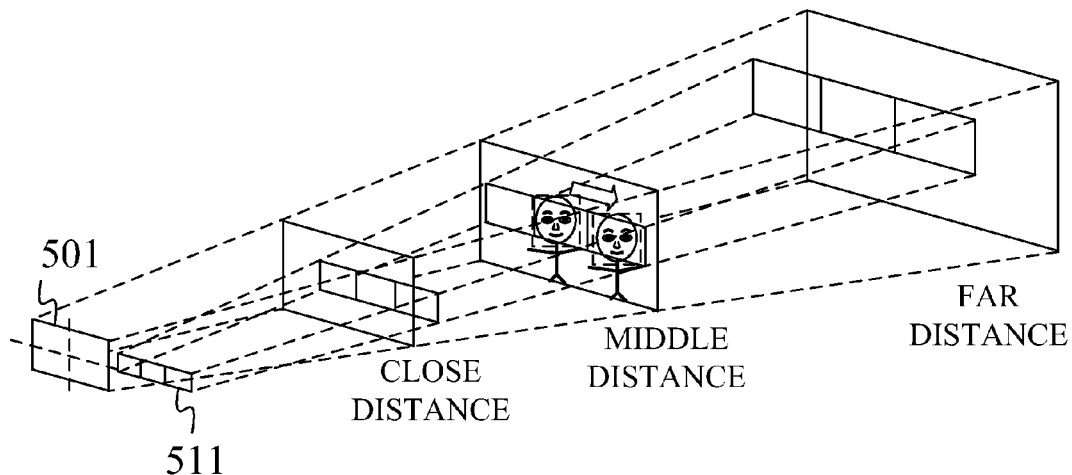
FIG. 17 shows movement of a face in an in-plane direction of an image pickup plane in Embodiment 2.
Figure 19:
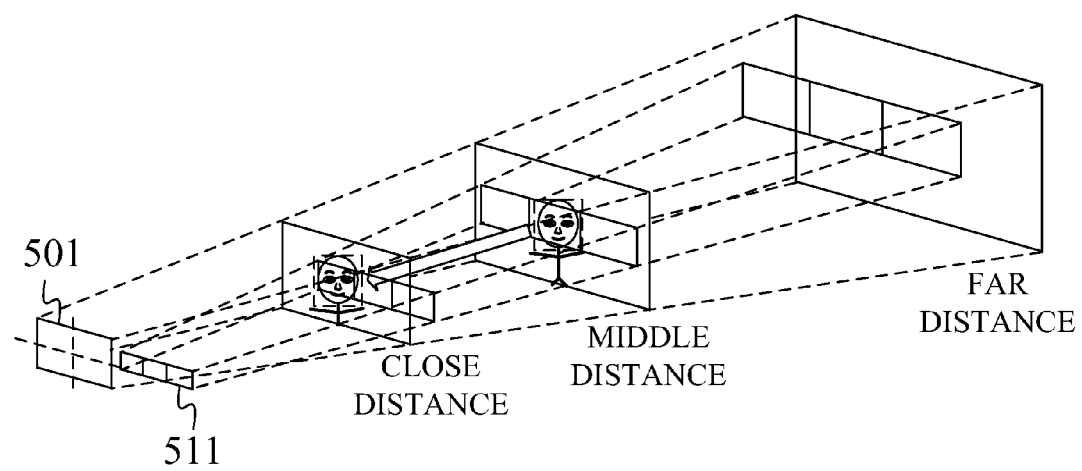
FIG. 19 shows movement of the face in an optical axis direction in Embodiment 2.

Specifically, a case where the position of the face area changes horizontally or vertically can be determined that the face has moved in the in-plane direction of the image pickup plane while keeping its distance from the camera as shown in FIG. 17. A case where the size of the face area increases can be determined that the face has moved in a direction approaching the camera in the optical axis direction as shown in FIG. 19. A case where the size of the face area decreases can be determined that the face has moved in a direction away from the camera in the optical axis direction. If determining that the face has moved, the controller proceeds to step S1603.

On the other hand, if determining that the face has not moved, the controller proceeds to step S1609 to step S1612. Processes performed at these steps are the same as those performed at step S1102 to S1105 shown in FIG. 11 in Embodiment 1. The controller proceeds from step S1612 to step S1613.

Figure 18:
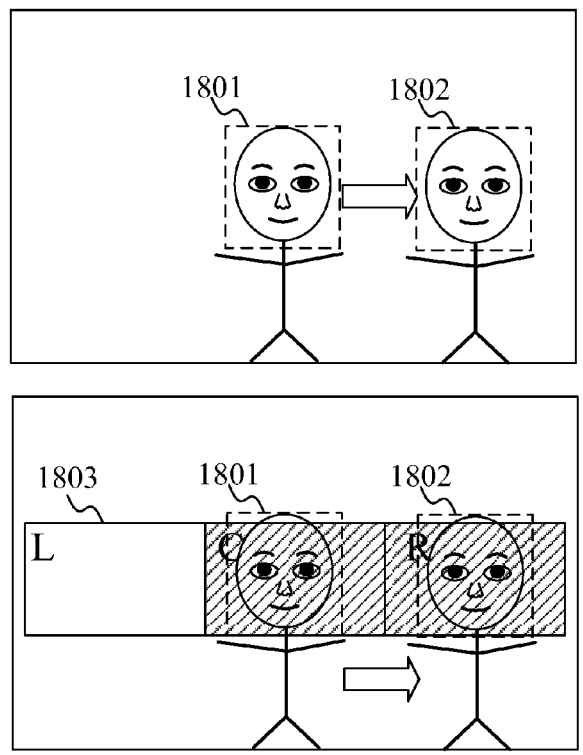
FIG. 18 shows a relationship between the movement of the face in the in-plane direction of the image pickup plane and an external ranging area in Embodiment 2.

At step S1603, the controller calculates a movement amount of the face in the in-plane direction of the image pickup plane. FIG. 18 shows a case where the face (face area) has moved from 1801 to 1802 in an image capturing field. At step S1603, the controller calculates a distance between the face area 1801 and the face area 1802 as the movement amount in the in-plane direction of the image pickup plane. In this case, as shown in a lower part of FIG. 18, an appropriate ranging area changes from a ranging area C to a ranging area R with the movement of the face.

Figure 20:
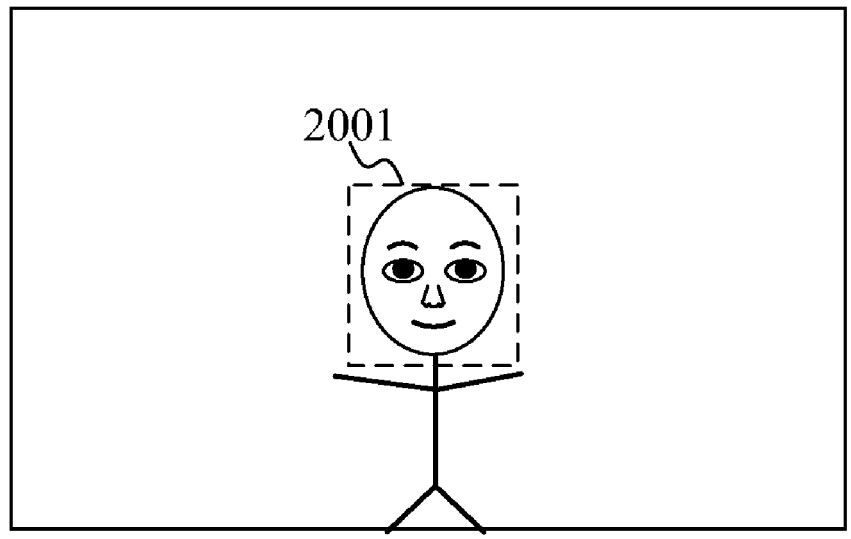
FIG. 20 shows an image pickup field including the face moving in the optical axis direction in Embodiment 2.
Figure 20:
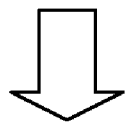
Figure 20:
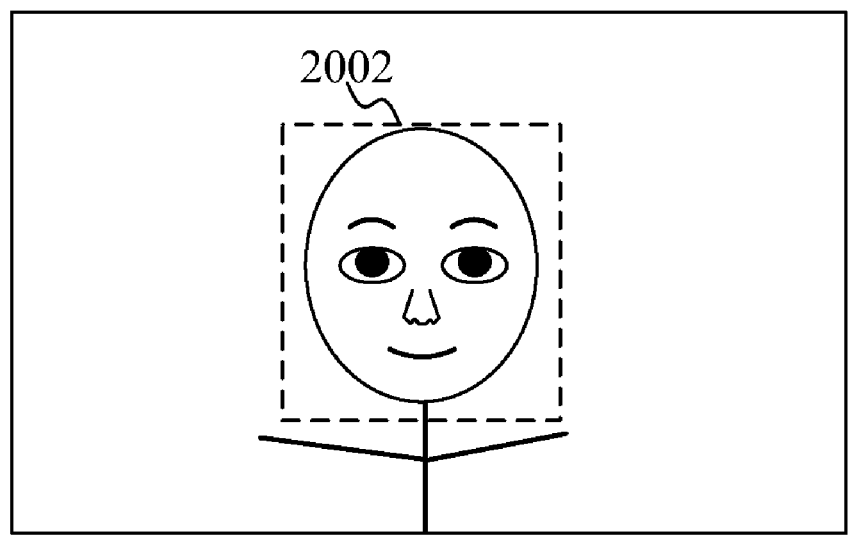

Next, at step S1604, the controller calculates the movement amount of the face in the optical axis direction. FIG. 20 shows a case where the face has moved in the direction approaching the camera (that is, from a middle distance (3 m) to a close distance (1 m)) and thereby the face area 2001 has enlarged to a face area 2002. At step S1604, the controller calculates a difference between a face distance corresponding to the face area 2001 and a face distance corresponding to the face area 2002 as the movement amount of the face in the optical axis direction. The face distance may be obtained by the ranging operation of the direct ranging AF unit 230, or may be calculated from profile data showing a relationship of the size of the face area with respect to the image capturing field and the face distance.

Figure 21:
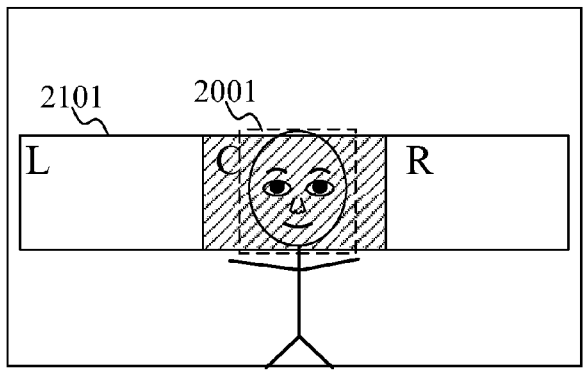
FIG. 21 shows a relationship between the movement of the face in the optical axis direction and the external ranging area in Embodiment 2.
Figure 21:
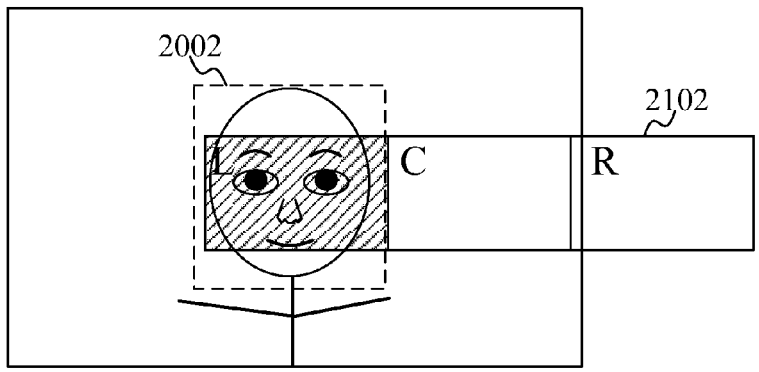

The ranging area appropriate for the face located at a center of the image capturing field before its movement (that is, the face distance was the middle distance (3 m)) is the ranging area C as shown in FIG. 21. On the other hand, the ranging area appropriate for the face located at the center of the image capturing field after its movement (that is, the face distance is the close distance (1 m)) is the ranging area L. Thus, although the position of the face in the image capturing field does not change, the change of the face distance requires changing of the using ranging area.

The controller proceeds to step S1605 after thus calculating the movement amount of the face at step S1603 and step S1604.

At step S1605, the controller predicts a position (hereinafter referred to as a "predicted movement position") of the face at a timing at which the direct ranging AF is to be next performed. Then, the controller selects an appropriate ranging area (next ranging area) for the face after its movement to the predicted movement position. In this selection, the controller calculates a three-dimensional moving speed of the face on the basis of the movements of the face shown in FIGS. 17 to 21 to predict the position of the face at the timing at which the direct ranging AF is to be next performed, and then selects the next ranging area on the basis of the predicted movement position.

Next, at step S1606, the controller determines whether or not the next ranging area selected at step S1605 coincides with the currently selected ranging area. If the next ranging area coincides with the currently selected ranging area, the controller proceeds to step S1607 to maintain the current ranging area, and then proceeds to step S1613. On the other hand, if the next ranging area does not coincide with the currently selected ranging area, the controller proceeds to step S1608.

At step S1608, the controller switches the using ranging area to the next ranging area calculated at step S1605. Then, the controller proceeds to step S1613.

At step S1613, the controller ends the ranging area selection processing, and then proceeds to step S708 shown in FIG. 7.

This embodiment can sequentially select appropriate ranging areas for the moving face, thereby enabling high-speed and highly accurate focusing on the moving face.

Although the above embodiments have described the configuration performing the direct ranging AF for the face, a configuration may be employed which performs the direct ranging AF only for a moving face to enable high-speed following AF, and performs the image pickup signal AF for a still face.

Figure 22:
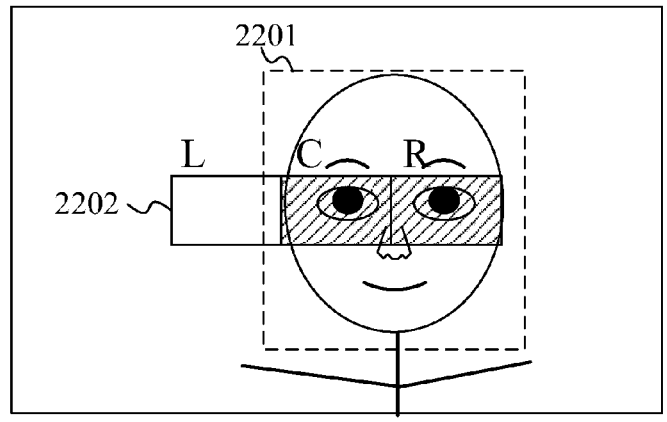
FIG. 22 shows a case where plural external ranging areas are simultaneously selected in Embodiment 3.

Moreover, although the above embodiments have described the case where one ranging area is allocated for one face, two or more ranging areas may be allocated for one face. There is a case where the ranging field 2202 of the direct ranging AF is disposed for the face area 2201 as shown in FIG. 22. In this case, using the ranging areas C and R in the ranging field 2202 for the face area 2201 enables more highly accurate ranging.

Furthermore, although the above embodiments have described the case where the three divided ranging areas L, C and R for the direct ranging AF are separately used, ranging areas other than the ranging areas L, C and R may be produced by arbitrarily combining pixels (photoelectric conversion elements) included in the respective ranging areas L, C and R.

Figure 23:
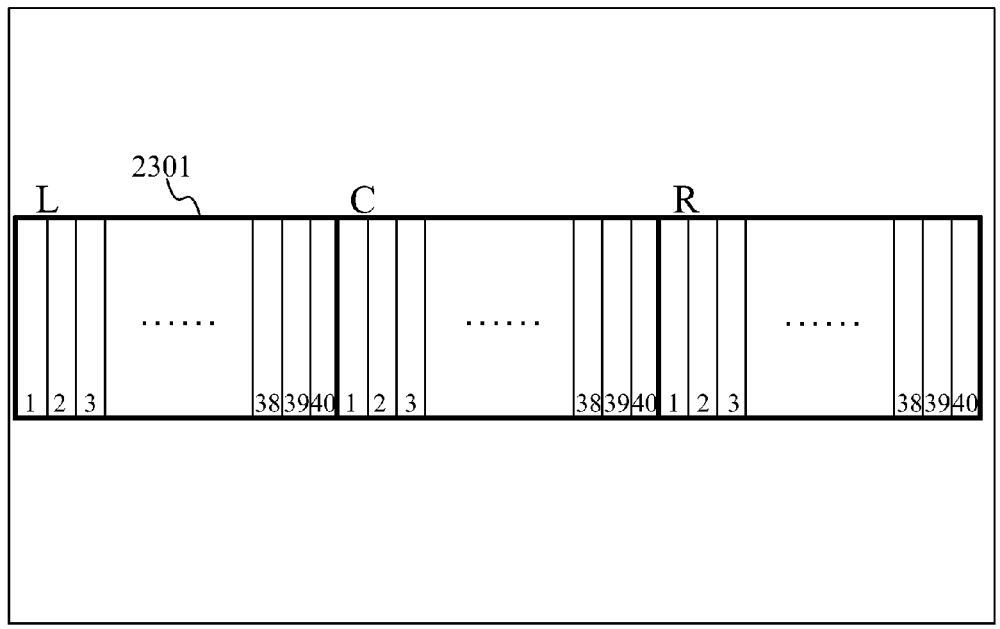
FIG. 23 shows a configuration of an external ranging sensor in the embodiment.
Figure 24:
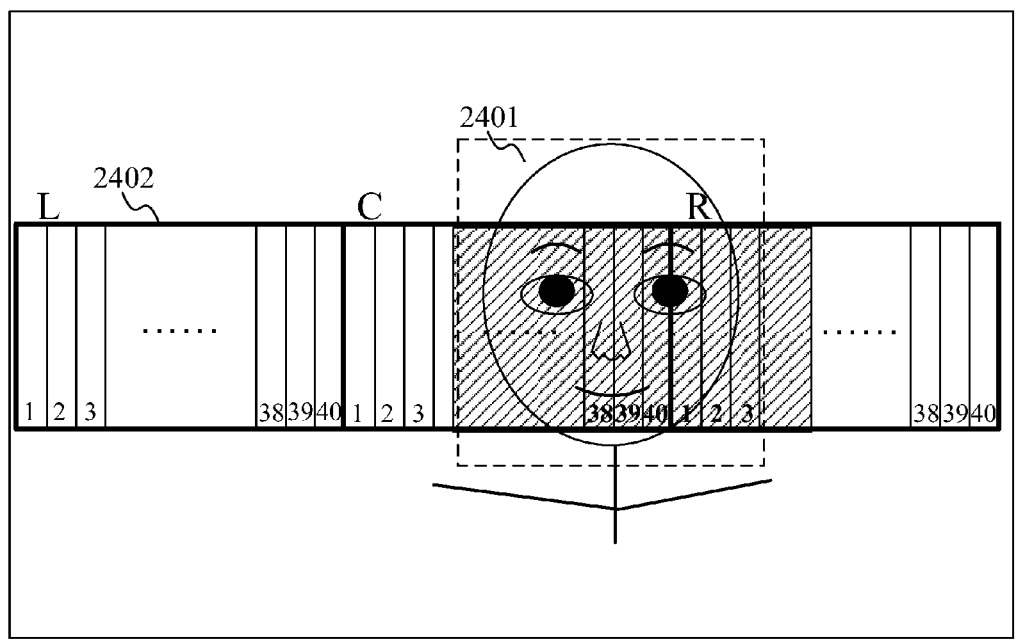
FIG. 24 shows a case where a new external ranging area is set in the external ranging sensor in the embodiment.

FIG. 23 shows a line sensor 2301 divided into the ranging areas L, C and R. Each ranging area includes 40 pixels. When a face area 2401 overlaps the line sensor 2301 at a position shown in FIG. 24, a ranging area may be produced by combining part of the pixels included in the ranging area C and part of the pixels included in the ranging area R. This enables more highly accurate ranging.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209422, filed Sep. 10, 2009 which is hereby incorporated by reference herein in its entirety.

What is claimed is:

1. An image pickup apparatus configured to photoelectrically convert an optical object image formed by an image taking optical system to generate object image data, the apparatus comprising:

a first detection unit configured to detect information corresponding to an object distance in each of plural areas, without through the image taking optical system;

a second detection unit configured to detect a size and a position of a specific object area in the object image data, the specific object area being a part of the object image data corresponding to the specific object; and a controller configured to perform focus control of the image taking optical system on the basis of the information corresponding to the object distance detected by the first detection unit, wherein the controller is configured to acquire specific object distance information on a distance from the apparatus to the specific object, on the basis of the size of the specific object area detected by the second detection unit and information on a focal length of the image taking optical system, and to select, from the plural areas, an area where the information corresponding to the object distance to be used in the focus control is detected, on the basis of the specific object distance information and the position of the specific object area detected by the second detection unit.

2. An image pickup apparatus according to claim 1, wherein the controller is configured to detect movement of the specific object to calculate a predicted movement position of the specific object, and to select the area to be used in the focus control for the specific object after the movement thereof to the predicted movement position.

3. A ranging method for an image pickup apparatus configured to electrically convert an optical object image formed by an image taking optical system to generate object image data, configured to detect information corresponding to an object distance in each of plural areas, without through the image taking optical system, and configured to perform focus control of the image taking optical system on the basis of the information corresponding to the detected object distance, the method comprising the steps of:

detecting a size and a position of a specific object area in the object image data, the specific object area being a part of the object image data corresponding to the specific object;

acquiring specific object distance information on a distance from the apparatus to the specific object, on the basis of the detected size of the specific object area and information on a focal length of the image taking optical system; and selecting, from the plural areas, an area where the information corresponding to the object distance to be used in the focus control is detected, on the basis of the specific object distance information and the detected position of the specific object area.

* * * * *